United States Patent [19]

Gall et al.

[11] Patent Number: 4,489,584
[45] Date of Patent: Dec. 25, 1984

[54] SINGLE STROKE, DRAW AND TRIM DIE ASSEMBLY

[75] Inventors: Owen M. Gall; Thomas L. Thomson; Robert S. Taylor, all of Columbus, Ind.

[73] Assignee: Hartup Tool, Inc., Columbus, Ind.

[21] Appl. No.: 446,313

[22] Filed: Dec. 2, 1982

[51] Int. Cl.³ .............................................. B21D 24/16
[52] U.S. Cl. ...................................... 72/327; 72/333; 72/334; 72/350
[58] Field of Search .................. 72/327, 326, 332–337, 72/464, 381, 382, 350, 351; 83/185, 186, 190, 191, 914

[56] References Cited

U.S. PATENT DOCUMENTS

| | | | |
|---|---|---|---|
| 1,766,217 | 6/1930 | Booth | 72/334 |
| 1,807,824 | 6/1931 | Booth | 72/334 |
| 1,838,061 | 12/1931 | Schwaerzer | 72/334 |
| 1,857,628 | 5/1932 | Eisenlohr | 72/336 |
| 1,965,228 | 7/1934 | Gabriel | 83/190 |
| 2,212,874 | 8/1940 | Brehm | 83/186 |
| 2,521,974 | 9/1950 | Hartup | 83/190 |
| 2,521,975 | 9/1950 | Hartup | 83/125 |
| 2,526,163 | 10/1950 | Shippy et al. | 83/186 |
| 2,629,439 | 2/1953 | Hartup | 83/190 |
| 2,828,632 | 4/1958 | Boultinghouse et al. | 74/435 |
| 2,898,996 | 8/1959 | Huser | 83/190 |
| 3,104,577 | 9/1963 | Callison | 83/185 |
| 3,748,791 | 7/1973 | Foster | 83/191 |
| 3,881,380 | 5/1975 | Paramonoff | 83/185 |
| 4,185,488 | 1/1980 | Miller et al. | 72/350 |
| 4,309,888 | 1/1982 | Miller et al. | 72/350 |

*Primary Examiner*—Daniel C. Crane
*Attorney, Agent, or Firm*—Sixbey, Friedman & Leedom

[57] ABSTRACT

A die assembly (2) which operates in a single stroke, both to draw and to trim a deformable sheet material such as sheet metal including relatively reciprocal upper and lower die sections (10,14) for draw forming a port and a trimming means (26), movable in a direction perpendicular to the relative reciprocal motion of the upper and lower die section (10,14), for cutting away a portion of the drawn material. The die assembly may include a fixed draw punch (18) over which the sheet material is drawn and a draw ring (52) shaped to complement the exterior shape of the draw punch (18) and to telescopically advance over the draw punch (18) during the drawing operation. At the end of the drawing operation, the draw ring (52) is positioned adjacent a trim punch (28) mounted on the lower die section (10). When in this lowered position, the draw ring (52) is released from its normally fixed lateral position and is free to move laterally in concert with the trim punch (28) during the lateral movements of the trim punch (28).

16 Claims, 4 Drawing Figures

SINGLE STROKE, DRAW AND TRIM DIE ASSEMBLY

DESCRIPTION

1. Technical Field

This invention relates to a die assembly which operates in a single stroke, both to draw and to trim a deformable sheet material such as sheet metal.

2. Background Art

The manufacture of drawn sheet metal parts has traditionally been a multi-step process normally taking place in separate dies, one for drawing and one for trimming. In some instances, the trimming operation takes place in two or more die stations requiring the drawn part to be moved from one die station to the next with attendant loss of time and potential for misloading and resulting destruction of the part and/or die. Where entirely separate draw and trim dies are required, even greater equipment and operating costs can be incurred in the manufacture of a drawn metal part.

Attempts have been made to reduce these costs by combining drawing and triming operations in a single die assembly such as illustrated in U.S. Pat. No. 3,372,569 to Bozek which discloses a die assembly for blanking, drawing and trimming material during a single downward stroke of the upper die element. In particular, Bozek teaches the use of a lower draw ring which is biased upwardly by pressurized draw pins 24 but which yields upon downward movement of the upper die element. U.S. Pat. Nos. 4,309,888 and 4,185,488 to Miller et al disclose additional examples of die assemblies for performing drawing and trimming operations.

While the die assemblies illustrated in the above noted patents are suitable for the manufacture of many parts, some drawn parts require a trimming action which must take place along an axis which is perpendicular to the axis along which the drawing operation of the die takes place. For example, the patent to Booth discloses a die assembly which is vertically actuated but which includes horizontally moving cutting and shearing components. Because the actuating mechanism for the horizontally moving component used in Booth is positioned laterally with respect to the part being trimmed, the size of the die assembly is very large, thereby requiring a very large mounting base in comparison to the part being manufactured.

Where a drawn part requires a trimming operation around its entire perimeter, highly specialized trimming dies may be employed such as embodied in a VULCAN BREHM one-stroke trimming die manufactured by Vulcan Tool Company, 730 Lorain Ave. Dayton, Ohio in which horizontal motion produced by a cam action shears and notches at right angles to the motion of the press. Trim die assemblies equipped to provide such horizontal motion are also illustrated in U.S. Pat. Nos. 2,521,974 and 2,629,439 to Hartup and U.S. Pat. No. 2,828,632 to Boultinghouse et al. These patents disclose a compact, cam actuated, mechanism located centrally within and below the lower half of a trim die to cause four right angle radial strokes of a trimming element. While extremely useful for the purposes disclosed, the patents to Hartup and Boultinghouse et al do not teach how a centrally mounted, cam actuated trimming mechanism can be used in the same die assembly which also serves to draw a part.

DISCLOSURE OF THE INVENTION

It is an object of this invention to overcome the deficiencies of the prior art by providing a compact die assembly which operates in a single cycle to draw a part from deformable sheet material by motion in a first direction and to trim the drawn part by motion in a second direction generally perpendicular to the first direction.

A more particular object of this invention is to provide a die assembly including relatively reciprocal upper and lower die elements for draw forming a part and further including trimming means for cutting away a portion of the drawn sheet material upon completion of a draw forming stroke by the die elements. The trimming means includes a trim die having a first cutting edge in the shape of the sheet material portion to be cut and mounted in a fixed position on one die element and a trim punch having a second cutting edge to complement the first cutting edge and mounted on the other die element for movement generally transverse to the direction of relative reciprocal motion of the die elements to create a shear/cutting action between the first and second cutting edges.

A still more specific object of this invention is to provide a one stroke, drawing and trimming die assembly including a fixed draw punch over which sheet material may be drawn along a draw axis and further including a trim punch which is normally held in a fixed, aligned position with respect to the draw punch during the drawing operation. However, when the drawing operation is complete, the trim punch is moved through successive radial movements in a plane transverse to the draw axis to cause the drawn material to be trimmed in a plane transverse to the draw forming axis.

Yet another object of the subject invention is to provide a die assembly draw ring which is shaped to complement the exterior shape of the drawn punch and which allows the draw ring to telescopically advance over the draw punch during the drawing operation. At the end of the drawing operation, the draw ring is positioned adjacent the trim punch and is released from its laterally fixed position to allow it to move in concert with the trim punch during the trimming movements of the trim punch.

It is another object of this invention to provide a die assembly having a draw pad which is telescopically received for movement along the draw punch and the trim punch during the drawing operation and which is biased toward the draw ring to grip sheet material during a drawing operation. At the end of the drawing operation, the bias pressure on the draw pad is relieved to eliminate the gripping pressure applied to the sheet material located between the draw ring and the draw pad during the trimming operation of the die assembly.

Still other and more specific objects of this invention will become apparent from a consideration of the following Brief Description of the Drawings and Best Mode for Carrying Out the Invention.

BRIEF DESCRIPTION OF THE DRAWINGS

FIG. 2 is a cross sectional view, taken in a plane which is different from the plane in which FIG. 1 is taken, of the die assembly of FIG. 1 following completion of the blanking and drawing operations, but before the trimming operation has taken place;

BEST MODE FOR CARRYING OUT THE INVENTION

Figure 1:
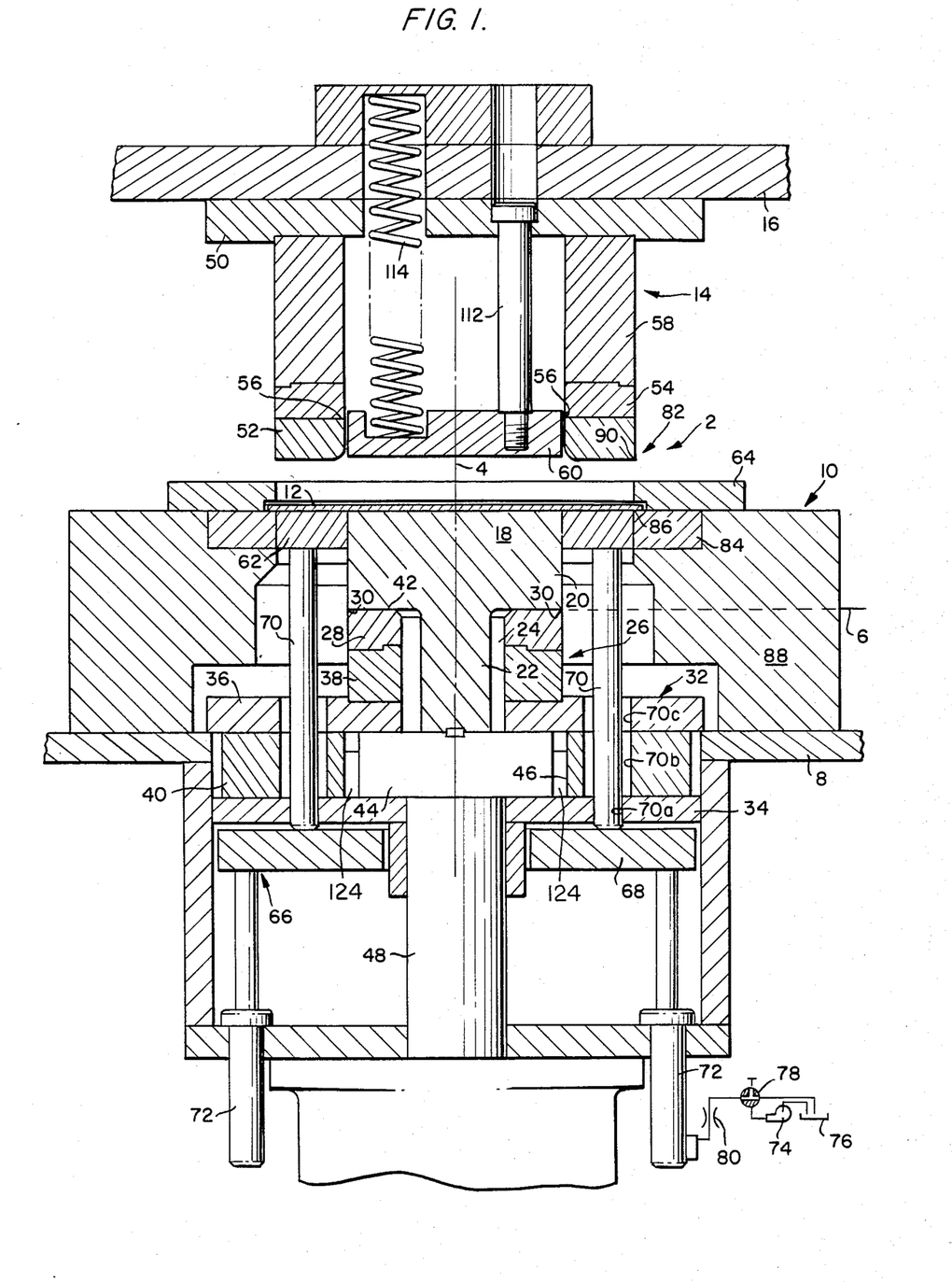
FIG. 1 is a cross sectional view of a die assembly designed in accordance with the subject invention wherein the upper and lower die sections are fully separated to allow stock sheet material to be placed between the die sections in preparation for a one stroke blanking, drawing and trimming operation by the die assembly.

For a clearer understanding of the subject invention, reference is initially made to FIG. 1 in which is illustrated a die assembly 2 capable of performing in one stroke both a drawing operation along a draw forming axis 4 and a trimming operation taking place in a trim plane 6 oriented generally perpendicularly with respect to the draw forming axis 4. The die assembly 2 designed in accordance with this invention is adapted to be operated within a hydraulically operated press of the type illustrated in more detail in U.S. Pat. Nos. 2,521,974; 2,629,439 and 2,828,632 all of which are assigned to the same assignee as this invention.

For purposes of gaining an understanding of the subject invention, only a portion of the hydraulic press needed to operate the subject die assembly 2 is illustrated in FIG. 1. In particular, the press is provided with a stationary mounting table 8 upon which is supported the lower die section 10 which constitutes a first die means for applying a draw forming force along the draw forming axis 4 to a piece of stock sheet material 12. An upper die section 14 is mounted on a movable machine ram 16 which is adapted to reciprocate along the draw forming axis 4 under the control of a plurality of die operating hydraulic cylinders (not illustrated). The upper die section 14 may be considered a second die means mounted for reciprocal movement relative to the lower die section 10 between a retracted position (illustrated in FIG. 1) and an advanced position (hereinafter illustrated in FIGS. 2 and 3). The upper die section is designed to apply to the remaining surface of sheet material 12 an opposing draw forming force to draw form the sheet material into a desired shape.

Sheet material 12 may be any one of a number of known drawable materials such as sheet metal, brass sheet metal or any other material which may be draw formed in a die.

cated in the center of the lower die section 10 is a draw punch 18 over which sheet material 12 may be drawn as the upper die section 14 moves from its retracted to its advanced position. Draw punch 18 has an upper head section 20 over which the sheet material 12 is drawn and a laterally reduced lower section 22 which forms an annular recessed cavity 24.

Mounted within annular recessed cavity 24 is one portion of a trimming means 26 for cutting away a portion of the drawn sheet material when the upper die section 14 is in its advanced position. Trimming means 26 is formed in part by a trim punch 28 having a trim cutting edge 30 adapted to cooperate with another trim cutting edge located in the upper die section 14. The shape of trim cutting edge 30 determines the configuration of the trimmed edge of the drawn part as will become more apparent in subsequent portions of this description. Trim punch 28 is mounted for movement in the trim plane 6 which is generally transverse to the draw forming axis 4 thereby causing drawn sheet material to be cut in a plane transverse to the draw forming axis 4. The transverse movement within the trim plane 6 of trim punch 28 is produced by an actuating means 32 upon which the trim punch 28 is mounted. Actuating means 32 functions to hold the trim punch 28 in a first position in which the trim punch 28 is in alignment with the draw punch 18 (illustrated in FIG. 1) to allow the sheet material 12 to be drawn over the draw punch 18 and the trim punch 28. Actuating means 32 also operates to displace the trim punch 28 within the trim plane when the upper die section 14 is in its fully advanced position illustrated in FIGS. 2 and 3.

Actuating means 32 includes a cam support plate 34 oriented generally parallel to the trim plane 6. Actuating means 32 further includes a lower mounting plate 36 upon which trim punch 28 is secured by means of a trim punch riser 38. The lower mounting plate 36 is fixedly mounted to a wobble plate 40 designed for supporting the mounting plate in a spaced parallel position with respect to cam support plate 34. Wobble plate 40 is not attached to cam support plate 34 and thus may be displaced transversely with respect to draw forming axis 4 as will be described. Because the lower surface 42 of the upper head section 20 of draw punch 18 is arranged generally parallel to the upper surface of cam support plate 34 upon which wobble plate 40 is slidingly mounted, the trim punch 28 is constrained to move only in a transverse direction in a plane parallel to trim plane 6.

Movement of the trim punch 28 is further constrained by an ingenuous arrangement of elements disclosed in greater detail in U.S. Pat. Nos. 2,521,974; 2,629,439 and 2,828,632 as referred to above. In particular, centrally disposed slide retainer 44 is fixedly connected to cam support plate 34 within a central opening 46 of wobble plate 40 The lowermost portion of draw punch 18 is fixedly secured to the upper section of the slide retainer 44 to thereby secure draw punch 18 in a fixed position relative to mounting table 8. Positioned within slide retainer 44 is a system of four separate thrust members mounted for reciprocal movement in response to the rotation of a cam mounted on rotatable shaft 48. By operation of this combination of elements, trim punch 28 is caused to be displaced in four successive strokes in opposite directions along two perpendicular axes located within the trim plane 6. The precise organization of these elements and their operation will be described in greater detail below in reference to FIG. 4.

Turning now to upper die section 14, an upper mounting plate 50 is arranged to secure the upper die section 14 to machine ram 16. Upper die section 14 further includes a draw ring 52 having an interior aperture configured to complement the exterior shape of draw punch 18 and allow the draw ring 52 to telescopically advance over the draw punch 18 as the upper die section 14 moves from its retracted to its advanced position. Mounted just above draw ring 52 and in spaced relationship with upper mounting plate 50 is a trim die ring 54 having a trim cutting edge 56 shaped to complement the trim cutting edge 30 of trim punch 28. Like draw ring 52, the trim die ring 54 has an interior aperture configured to complement the exterior shape of the draw punch 18 to thereby allow the trim die ring 54 to telescopically advance over the draw punch 18 as the upper die section 14 moves from its retracted to its advanced position. Trim die ring 54 is held in spaced relationship with respect to upper mounting plate 50 by means of a trim die riser 58 whose longitudinal length is selected to cause the trim cutting edge 56 to be positioned excactly opposite the trim cutting edge 30 of trim punch 28 when the upper die section 14 is in its advanced position (see FIGS. 2 and 3).

Figure 2:
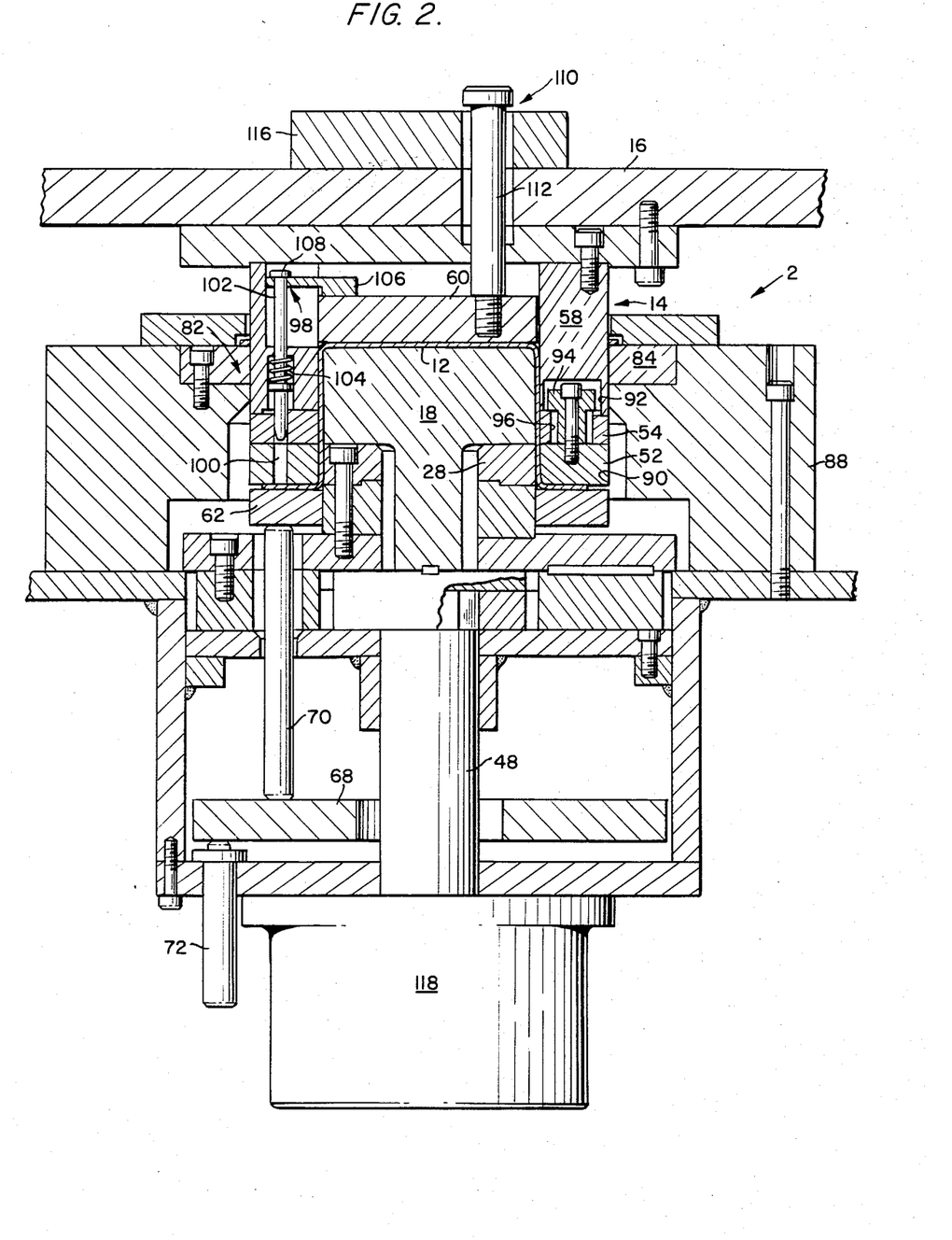
Figure 3:
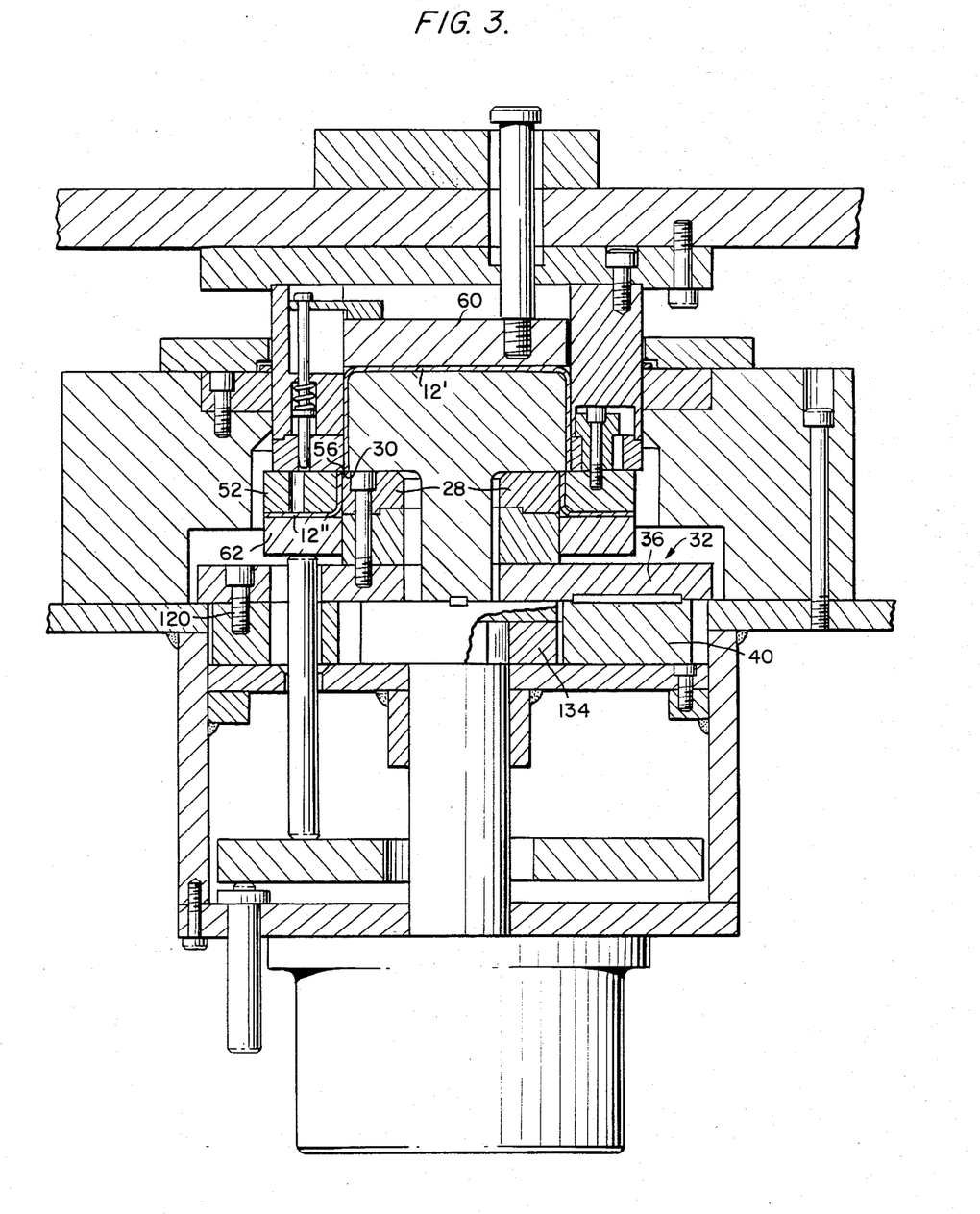
FIG. 3 is a cross section view of the die assembly of FIG. 2 following the trimming operation.

As will be explained in greater detail hereinbelow, draw ring 52 is mounted for limited movement in trim plane 6 in response to movement of the trim punch 28. Normally, draw ring 52 is held in a fixed position relative to the trim die ring 54 except when the upper die section 14 is moved to its advanced position (FIGS. 2 and 3). The mechanism for holding draw ring 52 in its locked position will be described in greater detail below with respect to FIG. 2.

Following the drawing and trimming operation, the upper die section 14 is returned to its retracted position and the formed and trimmed part (not illustrated) is removed from the upper die section 14 by means of a knockout pad 60. When the upper die section 14 moves to its advanced position, knockout pad 60 moves from its retracted position (FIG. 2) to its advanced position (FIG. 1) to effect the knockout operation.

To assist in performing the drawing operation, the die assembly 2 includes a draw pad 62 containing a central aperture for permitting the draw pad 62 to be telescopically mounted on the lower die section 10 for sliding movement over draw punch 18 and trim punch 28 from an advanced position (FIG. 1) to a retracted position (FIGS. 2 and 3) adjacent trim punch 28. While in its advanced position, draw pad 62 is generally aligned with the upper surface of draw punch 18. If the upper die section 14 is also in its retracted position as illustrated in FIG. 1, drawable sheet material 12 may be fed between the upper and lower die sections within a slot formed by positive stripper 64 which serves to guide the sheet material into a proper position for operation of the die assembly.

Downward movement of upper die section 14 causes draw ring 52 to engage a portion of the upper surface of drawable sheet material 12 and to grip this portion by virtue of the resistance to downward movement caused by draw pad 62. Such resistance is provided by a draw pad biasing means 66 including a pressure pad 68 mounted for reciprocal movement below the cam support plate 34 and a plurality of longitudinally movable pressure pins 70 extending through corresponding, aligned apertures 70a, 70b and 70c formed in cam support plate 34, wobble plate 40 and lower mounting plate 36, respectively.

Each pressure pin 70 contacts the pressure pad 68 at one end and the draw pad 62 at the other end. The draw pad biasing means 66 further includes a plurality of hydraulic cushion cylinders 72 for applying a force to the draw pad 52 through the pressure pad 68 and the pressure pins 70 in response to the supply of hydraulic fluid under pressure to the cushion cylinders 72. Fluid under pressure is supplied to each cylinder 72 via a hydraulic circuit including a pump 74 which draws fluid from a sump 76 and supplies such fluid under pressure through a valve 78. When the valve 78 is moved to the position illustrated in FIG. 1, fluid may be drained from the cushion cylinders 72 through a restricted orifice 80 designed for controlled bleeding of the cushion cylinders 72 during movement of the draw pad 62 from its advanced position to its retracted position and for allowing continued bleeding of hydraulic fluid from the cushion cylinders 72 when the draw pad 62 reaches its retracted position. This continued bleeding allows the gripping force applied to deformable sheet material 12 to be relaxed once the upper die section 14 reaches its fully advanced position. When operated to relieve the gripping force, the restricted orifice 80 may be considered as a disabling means for the draw pad biasing means 66. Upon release of the gripping force, the trimming operation may proceed by rotation of cam 44 effecting the multi-stroke radial movements of trim punch 28.

Alternatively, the pressure may be generated by the resistance to flow through the restriction orifice 80 as the cylinders 72 are forced to a retracted position. This controlled bleeding of hydraulic fluid allows the gripping force applied to the deformable sheet material 12 to relax once the upper die section 14 reaches its fully advanced position. When motion of the cylinders 72 has ceased, oil flow through orifice 80 also ceases, no more pressure exists and draw pad biasing means 66 may be considered to be disabled.

The die assembly 2 of FIG. 1 further includes a blanking means 82 for cutting out a blank of drawable sheet material from the stock sheet 12 illustrated in FIG. 1. The blanking means 82 includes a blanking die ring 84 having an outer blank cutting edge 86. The blanking die ring 84 is held in a fixed position relative to mounting table 8 by means of a blanking die ring support 88. The blanking means 82 further includes an inner blank cutting edge 90 formed on the draw ring 52 for cooperating with the outer blank cutting edge 86 to cut the blank of drawable sheet material as the upper die section 14 initially moves from its retracted position toward its advanced position.

Turning now to FIG. 2, the condition of the die assembly 2 is illustrated following execution of a blanking and drawing operation wherein the machine ram 16 has been lowered to cause the draw ring 52 to advance from the retracted position illustrated in FIG. 1 to a fully advanced position. During this downward movement, blanking means 82 has operated to cut out a blank of drawable sheet material. Continued downward movement of the upper die section 14 has resulted in the drawing of sheet material 12 over the draw punch 18 and, simultaneously, cushion cylinders 72 have resisted the downward movement of draw pad 62 to cause a portion of the stock sheet material 12 to be gripped between draw pad 62 and draw ring 52. It is apparent from FIG. 2 that draw ring 52 is mounted for lateral movement by means of a retaining cavity 92 formed in the lower end of trim die riser 58. A headed dowel 94 projects through an aperture 96 formed in the trim die ring 54. Because the head of retainer 94 is larger than the aperture 96, the draw ring 52 is held in fixed longitudinal position on the upper die section 14 but is permitted limited lateral movement. Normally, such lateral movement is prevented by locating means 98 including a plurality of locating holes 100 (only one illustrated in FIG. 2) contained in the draw ring 52 and a plurality of pins 102 (only one illustrated in FIG. 2) mounted for reciprocal movement within the trim die ring 54 and trim die ring riser 58. Biasing means in the form of springs 104 (only one illustrated in FIG. 2) operate to normally bias locating pins 102 into holes 100 except when knockout pad 60 nears its retracted position at which time a lifting bracket 106 connected with knockout pad 60 is arranged to engage the headed end 108 of locating pin 102 to cause the corresponding locating pin 102 to be retracted from locating hole 100.

FIG. 2 further illustrates knockout pad biasing means 110 including a plurality of bolts 112 (only one of which is illustrated in FIG. 2) and corresponding compression spring 114 (illustrated only in FIG. 1) which tends to bias the knockout pad 60 toward its advanced position. Bolts 112 provide a limit stop to define the advanced position of the knockout pad 60. A compression spring retainer 116 is mounted on the machine ram 16 to fix the upper end of compression springs 114.

FIG. 2 further discloses a drive unit 118 for providing rotational movement to cam shaft 48 in response to a control signal produced by a trimming machine control mechanism (not illustrated) which causes the drive unit 118 to effect one complete revolution of cam shaft 48 following completion of each downward stroke of the upper die section 14.

FIG. 3 discloses a position of trim punch 28 following displacement thereof by the actuating mechanism 32 to effect a trimming operation between trim cutting edges 30 and 56. FIG. 3 illustrates further how the draw ring 52 and the draw pad 62 are caused to move in concert with trim punch 28 whenever the actuating means 32 is operated. Once the draw ring 52 is returned to its aligned position (illustrated in FIGS. 1 and 2), the upper die section 14 may be returned to its retracted position after which the drawn sheet material 12' and the trimmed lower peripheral portion 12'' may be removed from the die assembly.

Figure 4:
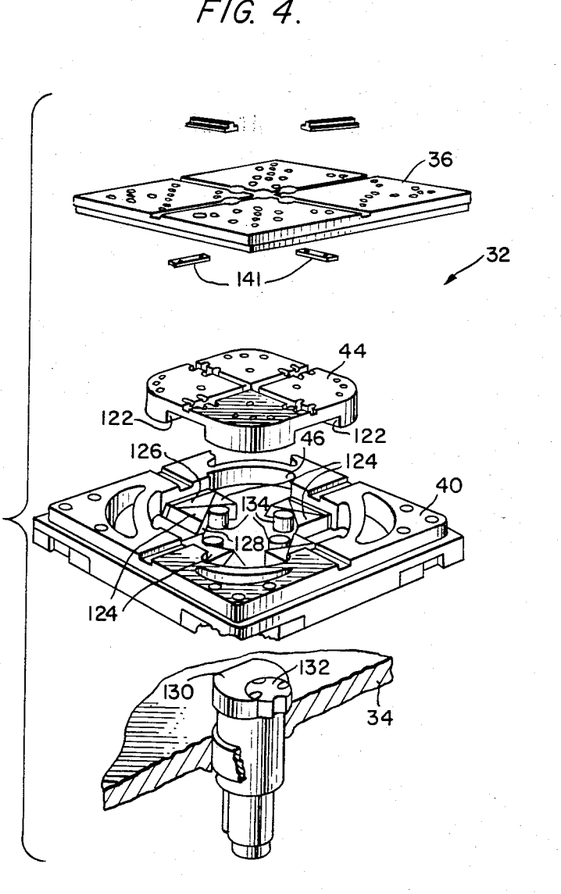
FIG. 4 is an exploded perspective view of a cam actuated mechanism used in the die assembly of FIGS. 1–3 to provide the trimming movement of the die assembly.

Reference is finally made to FIG. 4 in which an exploded view of the actuating means 32 is illustrated including lower mounting plate 36 which is fixed to wobble plate 40 by means of bolts 120 (only one is illustrated in FIG. 3) and by means of keys 141, to adjacent elements such as wobble plate 40. Wobble plate 40, as shown in FIG. 4, includes a central opening 46 within which may be received the slide retainer 44. Slide retainer 44 is fixed to the cam support plate 34 and contains a central cavity (not illustrated) and four radially directed channels 122 (only two of which are illustrated in FIG. 4) opening into the central cavity and arranged along two perpendicular axes. Four thrust members 124 are mounted for reciprocal movement within the channels 122, respectively. Each thrust member 124 has a thrust imparting end 126 and a thrust receiving end 128. The thrust imparting end 126 is generally perpendicular to the longitudinal axis of the corresponding thrust member 124 and is in sliding engagement with a corresponding surface formed in the central opening 46 of wobble plate 40. The thrust receiving ends 128 are located within the central cavity of slide retainer 44 and are positioned to engage a rotatable cam 130. As is more thoroughly discussed in U.S. Pat. No. 2,828,632, cam 130 may includes a roller insert 132 for successively engaging rollers 134 located on the thrust receiving ends 128 of each thrust member 124. Roller insert 132 is indexed by pins (not illustrated) which cause the cam 130, roller insert 132 and the thrust roller 134 to form a "toggle-like" engagement as the cam approaches successive thrust members 124. The arrangement of elements illustrated in FIG. 4 causes the wobble plate 40, lower mounting plate 36 and trim punch 28 to execute four successive radial movements in opposite directions along two perpendicular axes located within trim plane 6. For a more detailed description of this mechanism, reference is made to U.S. Pat. No. 2,828,632.

Operation of the die assembly as described above allows for a single one stroke operation of the upper and lower die sections to effect successively a blanking, drawing and trimming operation. Although not specifically described, the shape of the part being formed and the contour of the trimmed edge may take a great variety of different forms. In fact, the trimming operation may involve a hole punching operation in the side of the drawn part with or without edge trimming.

INDUSTRIAL APPLICABILITY

A die assembly of the type described has particular utility in the production of drawn sheet metal parts of extremely wide variety wherein such parts presently require separate drawing and trimming operations. Examples of such parts include lawn mower housings, transmission end caps, oven doors and tops, compressor housings, frying pans and lids, washing machine components, electric motor casings and the like. A particularly suitable application of the disclosed assembly is in the manufacture of stainless steel beer barrels wherein the component parts must be very accurately trimmed in order to allow acceptable integrity in the joining areas of the parts.

We claim:
1. A die assembly for drawing and trimming sheet material, comprising
    (a) a first die means for applying to one surface of the sheet material a draw forming force in one direction along a draw forming axis, said first die means including a fixed draw punch over which sheet material is drawn;
    (b) a second die means mounted for reciprocal movement relative to said first die means between a retracted position and an advanced position along said draw forming axis for applying to the other surface of the sheet material an opposing draw forming force to draw form the sheet material into a desired shape as said second die means moves from its retracted position to its advanced position said second die means including a draw ring having an interior aperture configured to complement the exterior shape of said draw punch and allow said draw ring to telescopically advance over said draw punch as said second die means moves from its retracted to its advanced position; and
    (c) trimming means for cutting away a portion of the drawn sheet material when said second die means is in its advanced position, said trimming means including
        (1) a trim die ring having a first trim cutting edge in the shape of the sheet material portion to be cut, said trim die being mounted in a fixed position of one of said die means, and
        (2) a trim punch having a second trim cutting edge, said trim punch being mounted on the other said die means for movement in a trim plane generally transverse to said draw forming axis to create a shear cutting action between said first and second trim cutting edges to trim the drawn sheet material in a plane transverse to said draw forming axis, said draw ring being mounted for limited movement in said trim plane in response to movement of said trim punch.

2. A die assembly as defined in claim 1, wherein said first said trim punch is mounted on said first die means and further wherein said trimming means includes actuating means for holding said trim punch in a first position in which the trim punch is in alignment with said fixed draw punch to allow the sheet material to be drawn over said fixed draw punch and said trim punch and for displacing said trim punch within said trim plane when said second die means is in its advanced position.

3. A die assembly as defined in claim 2, wherein said actuating means includes a cam support plate oriented generally parallel to said trim plane, a lower mounting plate upon which said trim punch is mounted, a wobble plate for supporting said mounting plate in a spaced parallel position with respect to said cam support plate and for allowing said lower mounting plate to move in a plane parallel to said trim plane and cam means for displacing said wobble plate, said lower mounting plate and trim punch as a unit in four successive strokes in opposite directions along two perpendicular axes located within the trim plane.

4. A die assembly as defined in claim 3, wherein said actuating means further includes a slide retainer fixed to said cam support plate and containing a central cavity and radially directed channels opening into said central cavity arranged along two perpendicular axes, four thrust members mounted for reciprocal movement within said channels, respectively, each said thrust member having a thrust imparting end in sliding engagement with said wobble plate and a thrust receiving end located within said central cavity and a rotatable cam mounted within said central cavity for rotation about an axis perpendicular to the trim plane, said rotatable cam having a profile which successively engages said thrust receiving ends and causes successive pairs of said thrust members to be displaced radially, one thrust member of each pair is displaced outwardly by said cam and the other thrust member is displaced inwardly by movement of said wobble plate.

5. A die assembly as defined by claim 2, wherein said second die means includes an upper mounting plate.

6. A die assembly as defined by claim 5, wherein said trim die ring is mounted in spaced relationship with respect to said upper mounting plate by a distance sufficient to cause said first trim cutting edge to be positioned exactly opposite said second cutting edge when said second die means is in its advanced position.

7. A die assembly as defined by claim 1, wherein said second die means includes locating means for holding said draw ring in predetermined locked alignment with respect to said trim die ring except when said second die means is in its advanced position.

8. A die assembly as defined by claim 7, wherein said draw ring locating means includes a plurality of locating holes in said draw ring, a plurality of pins mounted for reciprocal movement within said trim die ring and biasing means for normally biasing said pins into said locating holes.

9. A die assembly as defined by claim 8, wherein said second die assembly includes a knockout pad movable from an advanced position to a retracted position to allow said draw punch to be received telescopically within said second die means as said second die means moves to its advanced position and movable from said retracted position to said advanced position to knockout a drawn and trimmed part as said second die means moves to its retracted position.

10. A die assembly as defined by claim 9, wherein said draw ring locating means includes lifting means connected with said knockout pad and said locating pins to cause said locating pins to be withdrawn from said locating holes whenever said knockout pad moves into its retracted position.

11. A die assembly as defined by claim 1 further including a draw pad containing a central aperture for permitting said draw pad to be telescopically mounted on said first die means for sliding movement over said draw punch and said trim punch from an advanced position remote from said trim punch and adjacent one end of said draw punch and a retracted position adjacent said trim punch; said draw pad, when in its advanced position, being spaced from said draw ring when said second die means is in its retracted position by a distance which is greater than the thickness of the sheet material which is to be deformed whereby the undeformed sheet material may be moved into the space formed between said draw ring and said draw pad when said draw ring is in its advanced position and when said second die means is in its retracted position.

12. A die assembly as defined in claim 11, further including draw pad biasing means for controllably biasing said draw pad by resisting movement of said draw pad toward its retracted position with a force which is sufficient to cause the sheet material to be gripped between said draw pad and said draw ring as said draw pad is moved from its advanced to its retracted position.

13. A die assembly as defined in claim 12, wherein said draw pad biasing means includes disabling means for releasing the biasing force on said draw pad after said draw pad reaches its retracted position to relieve the gripping force on the material located between said draw ring and said draw pad.

14. A die assembly as defined by claim 13, wherein said draw pad biasing means includes a pressure pad mounted for reciprocal movement below said lower mounting plate and a plurality of longitudinally movable pressure pins extending through said cam support plate, said wobble plate and said lower mounting plate, each said pressure pin contacting said pressure pad at one end and said draw pad at the other end, said draw pad biasing means further including a plurality of hydraulic cushion cylinders for applying a force to said draw pad through said pressure pad and said pressure pins in response to the supply of hydraulic fluid under pressure to said cushion cylinders to cause said draw pad to move from its retracted position to its advanced position, and wherein said disabling means includes fluid from bleed orifices for allowing controlled bleeding of said cushion cylinders during movement of said draw pad from its advanced position to its retracted position and for allowing continued bleeding of hydraulic fluid from said cushion cylinders when said draw pad reaches its retracted position.

15. A die assembly as defined in claim 1, further including blanking means for cutting out a blank of drawable sheet material from a stock strip of sheet material, said blanking means including a blanking die ring having an outer blank cutting edge, a blanking die ring support for holding said blanking ring in a fixed position surrounding said draw punch, and an inner blank cutting edge formed on said draw ring for cooperating with said outer blank cutting edge to cut the blank of drawable sheet material as said second die means initially moves from its retracted position toward its advanced position.

16. A die assembly for drawing and trimming sheet material, comprising
(a) a first die means for applying to one surface of the sheet material a draw forming force in one direction along a draw forming axis said first die means including a fixed draw punch over which sheet material is drawn, (b) a second die means mounted for reciprocal movement relative to said first die means between a retracted position and an advanced position along said draw forming axis for applying to the other surface of the sheet material an opposing draw forming force to draw form the sheet material into a desired shape as said second die means moves from its retracted position to its advanced position, said second die forming means including a draw ring having an interior aperture configured to complement the exterior shape of said draw punch and allow said draw ring to telescopically advance over said draw punch as said second die means moves from its retracted position to its advanced position; and (c) trimming means for cutting away a portion of the drawn sheet material when said second die means is in its advanced position, said trimming means including (1) a trim die ring having a first trim cutting edge in the shape of the sheet material portion to be cut, said trim die being mounted in a fixed position on one of said die means, and (2) a trim punch mounted on said first die means having a second trim cutting edge, said trim punch being mounted on the other said die means for movement in a trim plane generally transverse to said draw forming axis to create a shear cutting action between said first and second trim cutting edges to trim the drawn sheet material in a plane transverse to said draw forming axis, said trim die ring being mounted so that said first trim cutting edge is positioned exactly opposite said second trim cutting edge when said second die means is in its advanced position, said draw ring being mounted for limited movement in said trim plane in response to movement of said trim punch; and (3) actuating means for holding said trim punch in a first position in which the trim punch is in alignment with said fixed draw punch to allow the sheet material to be drawn over said fixed draw punch and said trim punch and for displacing said trim punch within said trim plane when said second die means is in its advanced position, said actuating means including (a) a cam support plate oriented generally parallel to said trim plane, a lower mounting plate upon which said trim punch is mounted, a wobble plate for supporting said mounting plate in a spaced parallel position with respect to said cam support plate and for allowing said lower mounting plate to move in a plane parallel to said trim plane and cam means for displacing said wobble plate, said lower mounting plate and trim punch as a unit in four successive strokes in opposite directions along two perpendicular axes located within the trim plane, (b) a slide retainer fixed to said cam support plate and containing a central cavity and radially directed channels opening into said central cavity arranged along two perpendicular axes, four thrust members mounted for reciprocal movement within said channels, respectively, each said thrust member having a thrust imparting end in sliding engagement with said wobble plate and a thrust receiving end located within said central cavity and a rotatable cam mounted within said central cavity for rotation about an axis perpendicular to the trim plane, said rotatable cam having a profile which successively engages said thrust receiving ends and causes successive pairs of said thrust members to be displaced radially, one thrust member is displaced inwardly by movement of said wobble plate.

* * * * *